United States Patent [19]

Hirth

[11] 3,982,829
[45] Sept. 28, 1976

[54] EXPOSURE MEANS FOR PHOTOCOPYING APPARATUS

[75] Inventor: Heimo Hirth, Frankfurt am Main, Germany

[73] Assignee: Hoechst Aktiengesellschaft, Frankfurt am Main, Germany

[22] Filed: Nov. 18, 1974

[21] Appl. No.: 524,894

[30] Foreign Application Priority Data
Nov. 19, 1973 Germany............................ 2357721

[52] U.S. Cl................................... 355/1; 240/1 EL; 355/67
[51] Int. Cl.².......................................... G03B 27/00
[58] Field of Search .................. 355/1, 67, 71; 240/1

[56] References Cited
UNITED STATES PATENTS

| | | |
|---|---|---|
| 3,114,283 | 12/1963 | Gruner.................................... 240/1 |
| 3,125,013 | 3/1964 | Herrick................................... 355/1 |
| 3,163,080 | 12/1964 | Miller..................................... 355/1 |
| 3,175,481 | 3/1965 | Lahr....................................... 355/1 |
| 3,232,201 | 2/1966 | Frank et al. ............................ 355/1 |
| 3,825,335 | 7/1974 | Reynolds ................................ 355/1 |

*Primary Examiner*—Richard A. Wintercorn
*Attorney, Agent, or Firm*—Richard L. Schwaab

[57] ABSTRACT

A photocopying apparatus is disclosed of the type including optical means for progressively scanning an object in a strip-like manner and for projecting the image of the scanned strip portion of the object on a light-responsive medium that travels in synchronism with the scanning means. The invention is characterized by the provision of exposure means including a bundle of light conducting rods for illuminating the scanned strip portion of the object. The light output ends of the rods are arranged in a narrow zone that extends adjacent the object normal to the direction of scanning by the optical scanning means.

10 Claims, 4 Drawing Figures

EXPOSURE MEANS FOR PHOTOCOPYING APPARATUS

FIELD OF THE INVENTION

This invention relates to improved exposure means for a photocopying apparatus of the type including scanning means for scanning an object in a strip-like manner and for projecting the strip image on a light-sensitive medium which is displaced in synchronism with the scanning means.

BACKGROUND OF THE INVENTION

In the photocopying field, it is common to project an image of an original object onto a moving light-sensitive medium by means of moving optical devices in such a manner that no relative movement takes place between the reproduced image and the moving medium. Such a device is described in German Offenlegunsschrift No. 1,497,089, for example. In this device, the object is scanned by means of an oscillating pivotable mirror and reproduced on a synchronously moving light-sensitive medium. Another known system uses a planar support plate for the object and an arrangement of two groups of mirrors which scan the object while maintaining a constant optical path and also project an image of the object on a light-sensitive medium moving in synchronism thereto. The two mirror groups are moved at different speeds. Such a device is described in German Patent Specification No. 1,215,503. Finally, it is possible to move the object itself in synchronism with the light-sensitive medium and to reproduce the image of the object on the medium.

In electrophotographic apparatus using such a stripwise scanning of the object, accurate exposure of the scanned strip portion is normally quite critical. The gap width, the speed of travel of the light-sensitive medium, and the medium sensitivity determine the radiation intensity for the object. Various devices have been developed to increase the light yield in arrangements of the above kind. The aim of such measures always has been to achieve higher numbers of copies per minute with light sources of economically reasonable power requirements. For this purpose, spaced parallel fluorescent tubes are moved in synchronism with scanning along the object, which tubes illuminate the gap to be scanned between themselves. Curved mirrors have also been used in connection with such fluorescent tubes to further increase the radiation intensity. Finally, it has also been disclosed for scanning with a pivotable mirror to arrange a greater number of fluorescent tubes on both sides of the total zone scanned by the scanning beams in order to achieve a uniform and intense illumination of the original.

All those devices, however, have not been completely satisfactory since the light sources lead to locally different intensities of illumination and allow an increase of the copying speed only in connection with a technically and economically unreasonable increase of the lamp output.

A further disadvantage of known exposure arrangements resides in heat development. An increase of the lamp output results in a considerable and troublesome heating of the support plate for the object and of the structural elements in the vicinity thereof.

The present invention was developed to provide an exposure arrangement which is characterized by great simplicity and safety in operation, which overcomes the disadvantages of the known devices and which simultaneously can operate by means of commerical point light sources of highest performance.

SUMMARY OF THE INVENTION

Accordingly, a primary object of the present invention is to provide improved exposure means for photocopying apparatus of the type including scanning means for progressively scanning the object in a strip-like manner and for projecting the image of the scanned strip on a light-sensitive medium which travels in synchronism with the scanning means. The exposure means includes a bundle of light conductive rods arranged with their light outlet ends adjacent the object being scanned and contained in at least one narrow zone extending normal to the scanning direction, the light inlet ends of the rods being in an optical connection to a light source. The light outlet ends are preferably mounted on movable support means for displacement in synchronism with the strip-like scanning of the object.

The preferred embodiment of the invention is characterized in that the individual light conducting rods are combined at their light inlet end to form a bundle (or cable) the light inlet end of which is in optical connection with a light source, the cross-section of the bundle corresponding with the illuminating surface of the lamp. It is particularly desirable to use a circular bundle cross-section and an approximately point-shaped light source. This embodiment has the additional advantage that, by means of a point lamp of highest performance, a sufficiently uniform intensity of illumination of the object can easily be achieved by a circular cable cross-section. Furthermore, the light inlet end can be rotated about the cable axis without interfering with the uniformity of exposure. There is thus the possibility to illuminate a certain narrow extended surface independently of the geometry of the lamp.

Commercial light conducting rod bundles having variable cross-sections may be used for this purpose, for example.

A desired asymmetry in the light distribution along the scanned strip can be achieved by different packing densities of the light conducting rods. The asymmetry of the light distribution is desired to compensate the reduction of the resolving power of the lens at the edges and thus to obtain a uniform illumination of the original. In this arrangement, the transverse dimensions remain advantageously small, however. The transverse dimensions of the individual light conductors shall be small so that a high light intensity can be achieved at the outlet surface. Another increase of the intensity of the illumination and of the uniformity of the illumination can be achieved by providing two narrow zones of photoconductors parallel to one another and leaving free the corresponding scanned strip between them.

Optimum utilization of the light from the light conducting rods is achieved by arranging the ends of the rods in an inclined position with respect to the axis of the scanned strip of the object at such a distance therefrom that the cone of light leaving the rods just covers the width of the scanned strip. In a preferred embodiment of the invention the outlet ends of the rods are mounted on a movable frame by means of which they can be moved along the stationary object in the direction of scanning and in synchronism with the scanned strip. In a photocopying apparatus with pivotable mirror scanning (as shown in the German Offenlegungsschrift No. 1,497,089, for example) it is advantageous in accordance with the invention that the light outlet ends of the rods are mounted on a support element which is pivotable about the same geometric axis as is the pivotable mirror. This results in a very uniform exposure of the scanned strip. In the last-mentioned case, it is preferable in accordance with the invention that the light-conducting rods are combined to form a circular bundle which has a circular end surface for the light inlet the central axis of which coincides with the pivot axis of the mirror and of the frame and that the light inlet end of the bundle is rigidly connected with the frame. In this embodiment, the individual rods are not exposed to any mechanical bending stress, since they may be rigidly inserted in an exposure frame. Thus, the rotation of the circular end surface effects no troublesome change of the exposure conditions on the strip of the object since, even in the case of a stationary arrangement of the light source, the end surface remains uniformly exposed to light.

In accordance with a further object of the invention, it is particularly advantageous from the point of view of energy consumption that the light source be so arranged adjacent the fixing station that the heat energy produced by the light source is directly used for fixing. The light source may be arranged beneath the path of the copy carrying the material to be fixed. Advantageously, there may also be a blower which simultaneously cools the light source and passes the heated air thereof into the fixing station. These constructions may be made in a particularly simple manner since the light source, due to the use of the light conducting rods, can be moved practically freely and may be arranged at any place within the copying apparatus.

By means of the arrangement of the invention, it is possible to achieve a very uniform strip-wise exposure with high-performance standard light sources, the light outlet from the optical system being in the immediate vicinity of the object. It is also possible to expose the object obliquely (i.e., not perpendicularly) and to achieve thereby optimum contrast. Furthermore, the heat produced by a high-performance lamp may be irradiated at a relatively uncritical place of the device and simultaneously used there for fixing or drying the copy.

Other objects and advantages of the invention will become apparent from a study of the following specification when viewed in the light of the accompanying drawing, in which:

FIG. 3b is a sectional side elevation view taken along line IIIb — IIIb of FIG. 3a.

Figure 1:
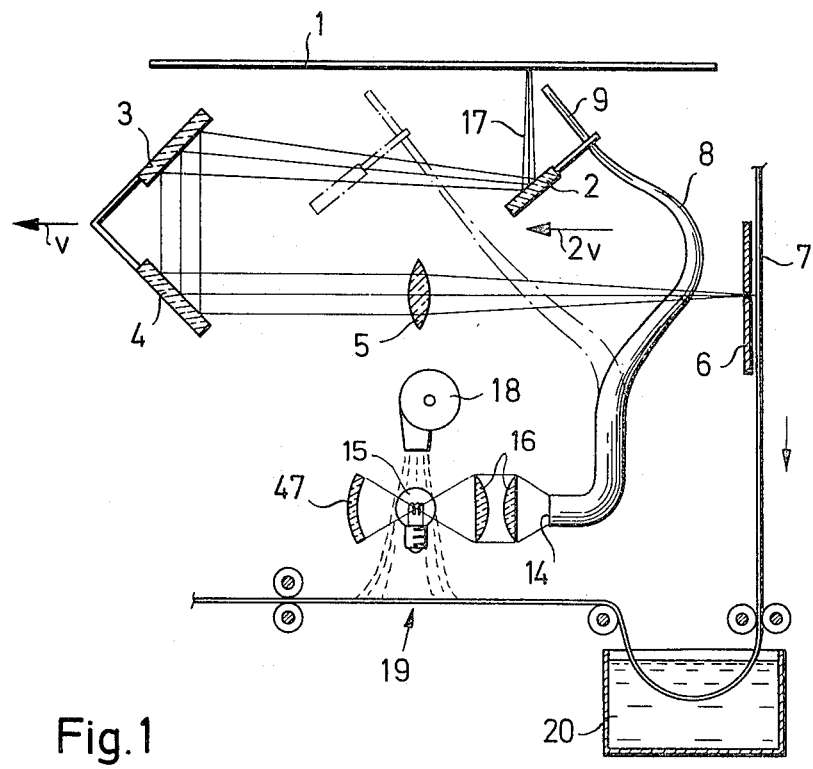
FIG. 1 is a diagrammatic view of the arrangement of the invention in an apparatus with a movable mirror scanning optical system.
Figure 2:
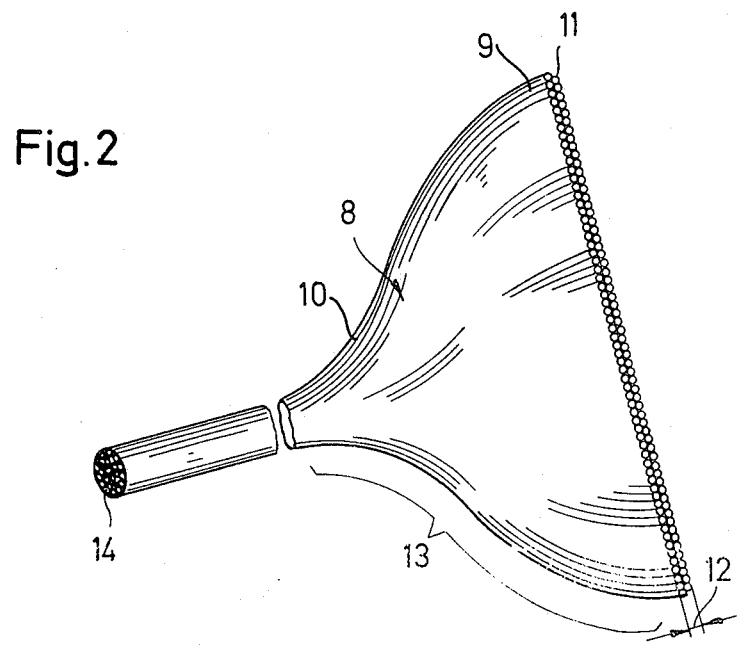
FIG. 2 is a diagrammatic view of the light conducting rod bundle used in accordance with the present invention.

In the photocopying apparatus shown diagrammatically in FIG. 1, an object 1 — such as an original sheet of copy — is scanned by means of a movable mirror scanning optical system having three mirrors 2, 3, and 4. The image of the object 1, by means of a lens 5, is synchronously projected onto light-sensitive material 7 moving past a stationary apertured plate 6. The mirror 2 is displaced at twice the speed of the mirrors 3 and 4. As illustrated in FIG. 2, the end 9 of the bundle 8 of individual light conducting rods 10 is connected with the mirror 2. The outlet ends 11 of the bundle of light conducting rods are arranged in a narrow zone 12 the length of which corresponds with the width of the object sheet extending transversely to the scanning device. The light conducting rods 10 terminate in the narrow zone 12, the front surfaces of these filaments being all in one plane or at least parallel. In the transition zone 13, the individual light conducting rods 10 are combined to form a circular bundle the circular end surface 14 of which represents the light inlet of the light conducting bundle 8. The end surface of this bundle is illuminated by a lamp 15 of highest performance with an approximately point-shaped light source by means of a condenser lens a.rangement 16 and a concave mirror 47. The light passing from the condenser lens arrangement 16 into the light conducting bundle is transmitted in known manner and substantially unweakened condition to the light outlet front surfaces 11 of the individual light-conducting rods 10. In this manner, an extraordinarily uniform and very intense illumination of the scanned strip of the object sheet 1 is achieved. A point light source may be used which may be far away from the actual scanning place. In this manner, only the radiation required for exposure reaches the object sheet; heat stress of the object sheet is thus reduced to a minimum.

The embodiment shown in FIG. 1 has a blower 18 which cools the lamp 15 and simultaneously effects drying in the fixing station 19 of the web 7 developed in the developing trough 20. Optimization of the energy requirement of a photocopying machine is thus achieved in the simplest manner. Obviously, it is also possible to use two light outlet ends of a common cable or two separate cables 8.

Figure 3A:
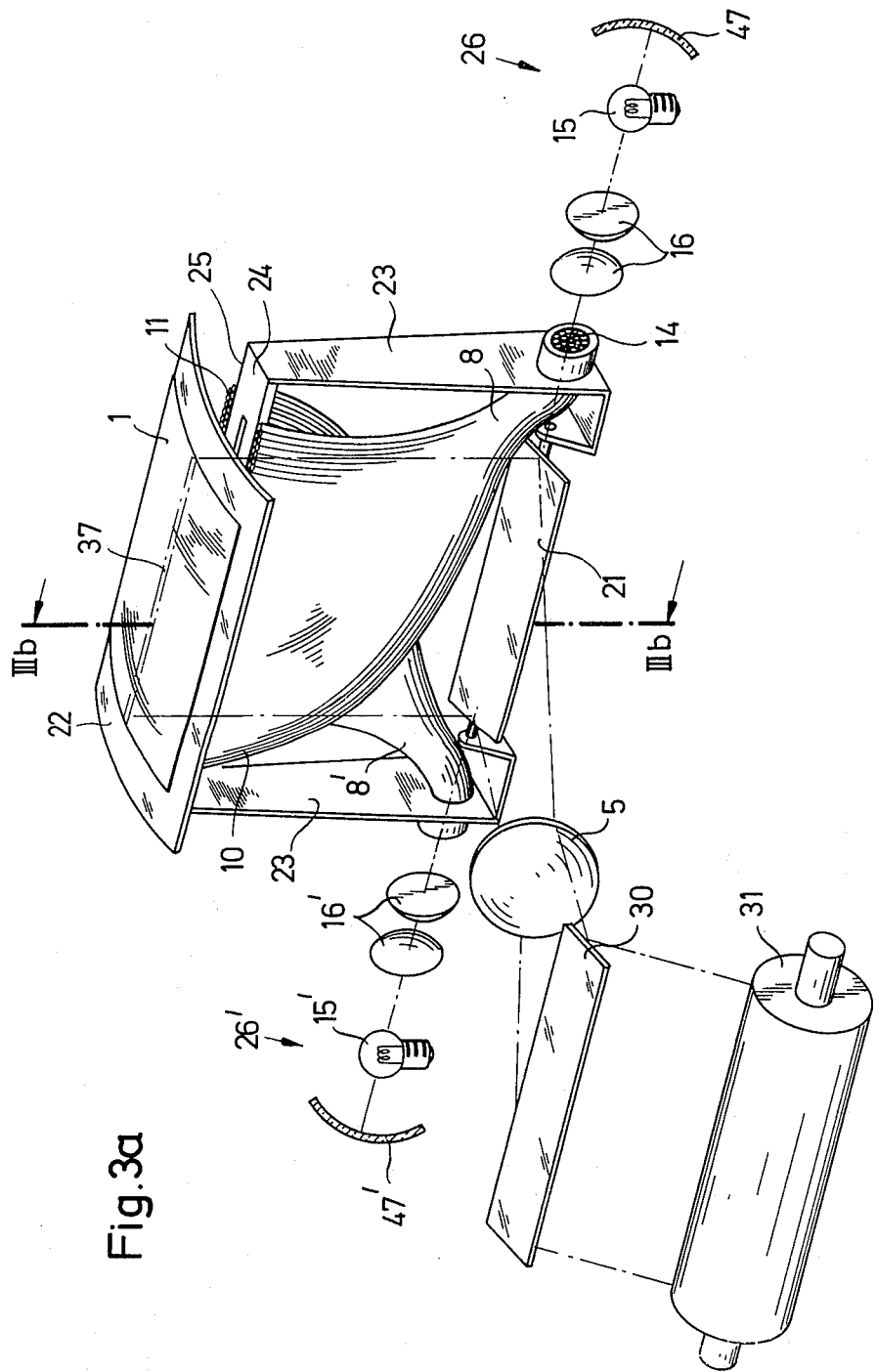
FIG. 3a is a perspective exploded view of the arrangement in an apparatus with a pivotable mirror optical system.
Figure 3B:
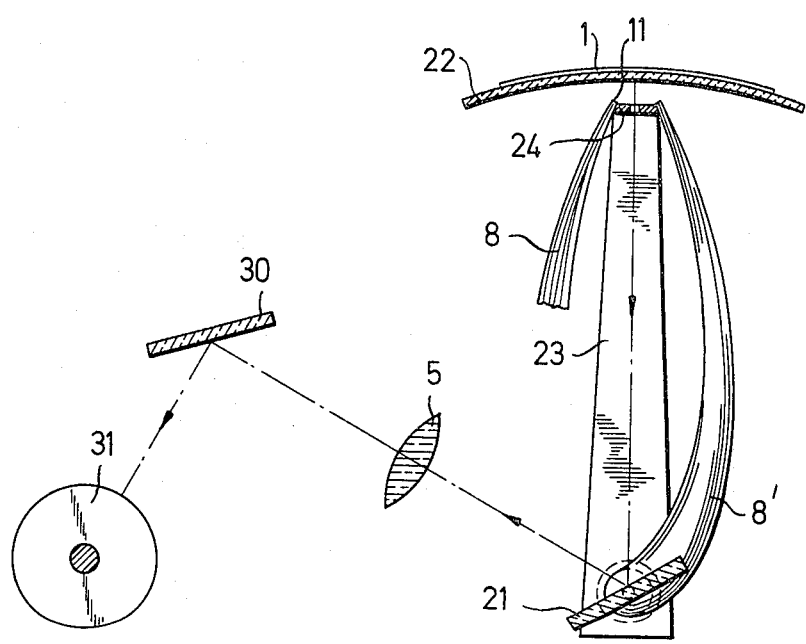

Another embodiment of the arrangement with two groups of photoconductors is shown in FIGS. 3a and 3b. In this arrangement, an object sheet 1 arranged on a curved partly cylindrical surface 22 is scanned by means of a pivotable mirror 21, the axis of the cylindrical support plate 22 coinciding with the pivot axis of the mirror 21. By means of arms 23, a frame 24 is rotated about the same geometric axis as the pivotable mirror and is arranged at a small distance beneath the cylindrical support plate 22. The frame 24 leaves a zone free which has at least the size of a scanning strip limited by an aperture (not shown) but corresponding to the aperture in the plate 6 in FIG. 1. A great number of individual light conducting rods 10 is firmly connected with the longitudinal sides 25 of the frame 24. These individual light conducting rods, which have a diameter of 100 $\mu$m, for example, are combined to form a circular light conductive bundle 8 outside the actual scanning zone. The light inlet end of the bundle 8 is firmly connected with the arm 23. The bundle 8 is so arranged that the central axis of the circular end surface of the bundle 8 coincides with the pivot axis of the exposure system 26. The exposure system 26 consists of a light source 15 of a high luminous density, a condenser lens arrangement 16, and a concave mirror 47. The exposure system 26 is stationary and arranged in the photocopying device.

In the embodiment shown in FIGS. 3a and 3b, the photoconductors 10 are combined to form two different bundles 8 and 8' which each terminate on one side of the mirror. Correspondingly, there are also two completely equivalent illumination devices 26 and 26'. The exposure scanning system comprises a rigid unit including arms 23, the frame 24 and the light conductive bundles 8, 8', whereby the light conductors are not exposed to bending stress during swivel scanning. The light conductors, the frame 24, and the arms 23 can be rigidly connected with one another and the unit may be cast in plastic material, for example.

Any susceptibility of the arrangement is thus avoided. The uniformity of the exposure is maintained despite the rotation of the cable 8 about its central axis since the point light source, in connection with the condenser lens arrangement 16 and the mirror 47, yields an extraordinary, uniform intensity of illumination across the circular front surface of the cable 8. This arrangement assures that always only the strip 37 is exposed to light which is arranged within the frame 25 and reproduced by the mirror 21 via the lens 5 and the reflector mirror 30 onto the light sensitive material 31 moving in synchronism with scanning. Strip-wise exposure to light in correspondence with the strip-wise scanning without additional moving optical parts (movable lamp carriage, additional pivotable concave mirrors) is not possible with conventional means.

In addition to the advantages mentioned above, the following advantages of the invention should be pointed out in particular. The light is passed to the scanning place practically without a power loss and with the desired opening angle. The contrast may become particularly great in that scanning of the original takes place in the direction of the normal and exposure, however, takes place at an angle thereto of about 45°C which may vary up or down. In this manner, a reflection on smooth, printed areas which may lead to a considerable reduction of the contrast is prevented toward the light-sensitive material. It is not possible with conventional means to achieve an oblique illumination of the original in the same manner despite highest light utilization. Furthermore, the heat of the light source can be produced exactly there where such a heat is desired, viz. in the zone of the fixing or drying station.

The principles of the present invention are applicable to photocopying apparatus or the electrophotographic or electrostatic type. While the preferred forms and embodiments of the invention have been illustrated and described, it will be apparent that various other modifications may be made without deviating from the inventive concepts.

What is claimed is:

1. In a photocopying apparatus including means for progressively optically scanning an object in a strip-like manner in synchronism with the travel of a light-sensitive medium and for projecting on said medium an image of the scanned portion of said object; the improvement which comprises exposure means for illuminating the scanned strip portion of said object, comprising
   a. at least one flexible bundle of light conducting rods the light outlet ends of which terminate adjacent the object in at least one narrow zone which extends normal to the direction of scanning of said scanned object, the length of said zone corresponding with the width of the object, the light inlet ends of said rods being combined in the form of a bundle having a circular cross-sectional configuration terminating in an inlet end surface; and
   b. means including a light source for illuminating the light input ends of said rods, said light source being adjacent said bundle inlet end surface and the illuminating surface of said light source corresponding with said bundle cross-section, whereby uniform illumination of said object is achieved.

2. Photocopying apparatus for reproducing the image of an object upon a continuously travelling light-sensitive medium, comprising
   a. means for progressively optically scanning the object in a strip-like manner in synchronism with the travel of the light-sensitive medium and for projecting on said medium an image of the scanned portion of said object; and
   b. means for illuminating only the scanned strip portion of said object, said illuminating means including
      a. at least one flexible bundle of light conducting rods the light outlet ends of which terminate adjacent the object in at least one narrow zone which extends normal to the direction of scanning of said scanned object, the length of said zone corresponding with the width of the object, the light inlet ends of said rods being combined in the form of a bundle having a circular cross-sectional configuration terminating in an inlet end surface, the outlet ends of said rods being connected with said scanning means for displacement relative to the object in a direction normal to said narrow zone in synchronism with the scanning of the object; and
      b. means including a light source for illuminating the light input ends of said rods, said light source being adjacent said bundle inlet end surface and the illuminating surface of said light source corresponding with said bundle cross-section, whereby uniform illumination of said object is achieved.

3. Apparatus as defined in claim 2, wherein said photocopying apparatus includes an image fixing station, said light source being located in such a manner adjacent said image fixing station that heat from said light source is applied to said image carrying medium.

4. Apparatus as defined in claim 3, wherein said light source is arranged adjacent that side of the light-sensitive medium upon which the image is projected, and further including blower means arranged on the opposite side of said light source from said light-sensitive medium for directing air onto said medium.

5. In a photocopying apparatus including means including a pivotable mirror for progressively optically scanning an object in a strip-like manner in synchronism with the travel of a light-sensitive medium and for projecting on said medium an image of the scanned portion of said object;
the improvement which comprises exposure means for illuminating the scanned strip portion of said object, comprising
   a. at least one bundle of light conducting rods the light outlet ends of which terminate adjacent the object in at least one narrow zone which extends normal to the direction of scanning of said scanning means, the axes of said optical scanning means and the light output ends of said rods being arranged at different angles relative to the object;
   b. means including a light source for illuminating the light input ends of said rods; and c. frame means supporting the light outlet ends of said rods for pivotal movement about the pivot axis of said pivotable mirror.

6. Apparatus as defined in claim 5, and further wherein said illuminating means includes condensing lens means arranged between said light source and the light input ends of said rods, and an optically concave mirror facing and arranged on the opposite side of said light source from said condensing lens means.

7. Apparatus as defined in claim 5, wherein the axes of said optical scanning means and the light output ends of said rods are arranged at different angles relative to the object.

8. Apparatus as defined in claim 5, wherein the light inlet ends of said rods are combined in the form of a cable having a circular cross-section, the axis of said cable being colinear with the pivot axis of said pivotable mirror and said frame means, the light inlet end of said cable being rigidly connected with said frame means.

9. Apparatus as defined in claim 8, wherein said illuminating means is stationary and arranged opposite the light input end of said circular cable of light conducting rods.

10. Apparatus as defined in claim 9, and further including a second bundle of light conducting rods, the light outlet ends of said second bundle of rods being arranged parallel with and spaced on the opposite side of the scanning strip from the light outlet ends of said one bundle of rods, the light outlet ends of said second bundle of rods being combined in the form of a second cable having a circular cross-section, the axis of said second cable being colinear with the pivot axis of said mirror and said frame means, the light inlet end of said second bundle being rigidly connected with said frame means, the light inlet end of said second cable extending in the opposite direction from the light inlet end of said one bundle, and means for illuminating the light input end of said second cable.

\* \* \* \* \*